United States Patent [19]

Britson

[11] 4,240,658
[45] Dec. 23, 1980

[54] TRUSS LIFTING HOOK AND METHOD FOR USING SAME

[76] Inventor: Stanley Britson, White Fox Rd., Webster City, Iowa 50595

[21] Appl. No.: 116,041

[22] Filed: Jan. 28, 1980

[51] Int. Cl.³ .................................................. B25J 1/00
[52] U.S. Cl. .................................................. 294/19 R
[58] Field of Search ................ 294/19 R, 1 R, 16, 17, 294/22, 23, 24, 26, 85, 86 R, 92; 52/122, 125, DIG. 1; 248/351, 357, 353; 254/17, 22, 121, 131

[56] References Cited

U.S. PATENT DOCUMENTS

| | | | |
|---|---|---|---|
| 2,246,630 | 6/1941 | Johnson | 294/19 R |
| 2,472,500 | 6/1949 | Swanson | 294/86 R |
| 2,933,243 | 5/1961 | Bowers et al. | 114/230 |
| 3,101,500 | 8/1965 | Paolantonio | 15/118 |
| 3,108,834 | 10/1963 | Cassara | 294/19 R |
| 3,219,376 | 11/1965 | Peters | 294/16 |
| 3,888,535 | 6/1975 | Rosso | 294/19 R |
| 4,089,553 | 5/1978 | Frykholm | 294/19 R |
| 4,165,114 | 8/1979 | Nutter | 294/19 R |

*Primary Examiner*—James B. Marbert

*Attorney, Agent, or Firm*—Zarley, McKee, Thomte, Voorhees & Sease

[57] ABSTRACT

An apparatus and method for lifting a truss. The apparatus includes a generally U-shaped hook having spaced apart opposite ends, an elongated shaft having a handle end and an opposite hook end connected to one end of said hook, and a rod substantially co-extensive with said shaft and longitudinally slidable therealong between a first position wherein the rod is substantially clear of the space between the opposite ends of the hook so that a truss beam may be received therein and a second position wherein the rod extends substantially across the space whereby withdrawal of the beam between the opposite ends of the hook is prevented. Because the rod is substantially co-extensive with the shaft, it may be manipulated adjacent the handle end of the shaft for movement of its opposite ends between the first and second positions. The elongated slot may have lateral extensions for receiving the projection to releaseably secure the rod in its first and second positions, respectively.

13 Claims, 6 Drawing Figures

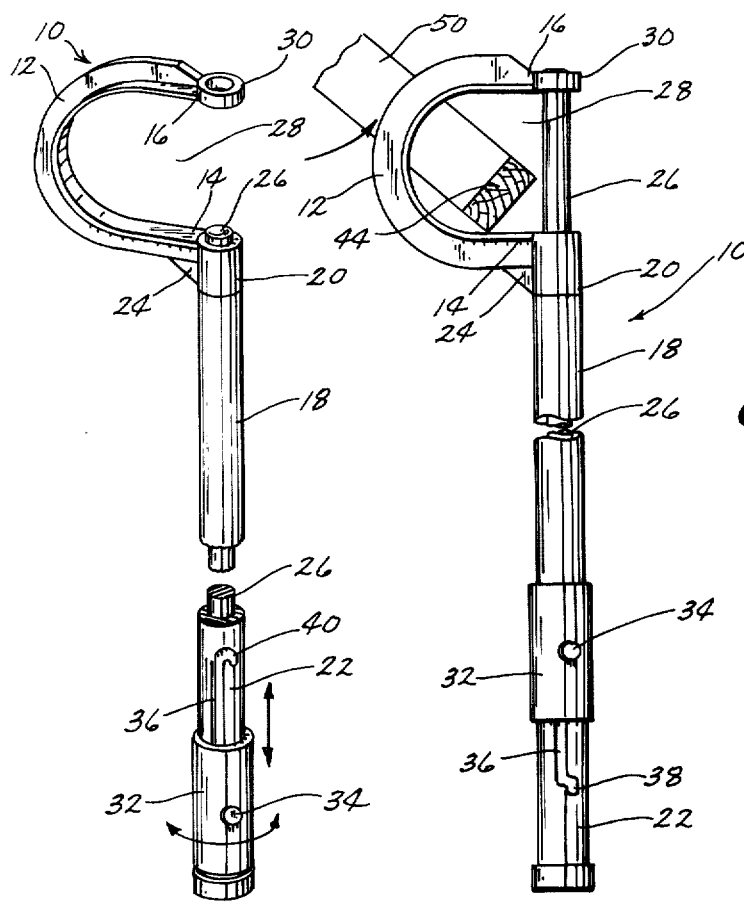
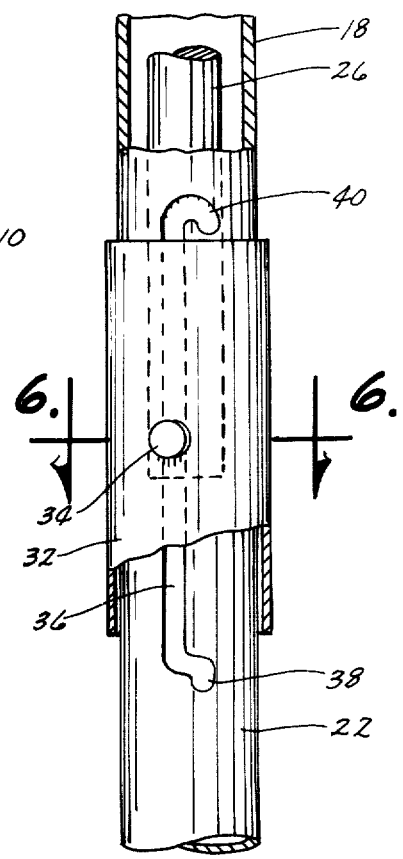
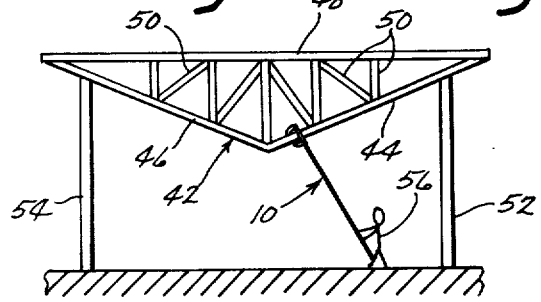
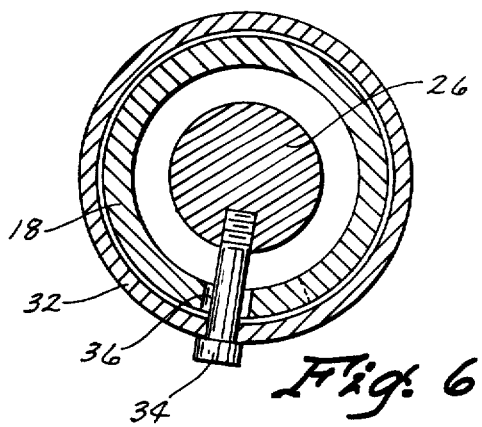
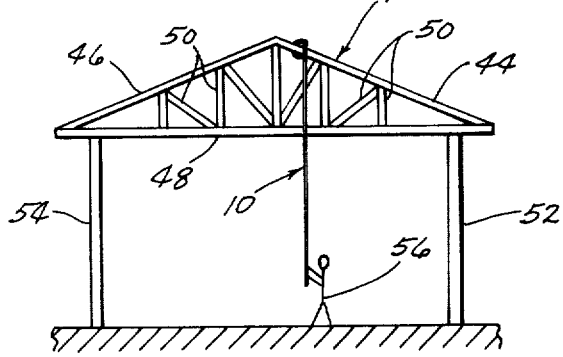

TRUSS LIFTING HOOK AND METHOD FOR USING SAME

BACKGROUND OF THE INVENTION

The present invention relates generally to a method and apparatus for lifting trusses and more particularly to an improved method and apparatus using an elongated shaft having a hook at one end for receiving a truss beam and means at the other end for opening and closing the hook for respectively receiving and holding a truss beam.

The customary method for placing truss beams in position during the construction of houses and the like involves placing the trusses in an inverted position on a pair of spaced apart walls. After the trusses are in place, each is rotated so that its apex points upwardly. This is normally done with the use of a long 2×4 piece of lumber notched at one end for engaging a portion of the truss for lifting and rotating the same into place. The notched 2×4 can easily slip and when this happens, the truss is released to fall upon the carpenter handling the 2×4. Serious bodily injury often results.

Accordingly, it is an object of the present invention to provide an improved apparatus and method for lifting a truss.

Another object is to provide such an apparatus and method wherein a beam of the truss is securely engaged within a hook at one end of an elongated shaft which includes means for closing and opening the hook.

Another object is to provide such an apparatus and method wherein means are provided at the handle end of the shaft for closing and opening the hook at the opposite end of the shaft.

Another object is to provide such a method and apparatus including means for releasably locking the hook in a closed condition to prevent withdrawal of the truss beam being lifted.

Finally, another object is to provide such an apparatus which is economical to manufacture, simple and rugged in construction and efficient in operation.

SUMMARY OF THE INVENTION

An apparatus and method for lifting a building truss structure utilizes an apparatus comprising a generally U-shaped hook having spaced apart opposite ends, an elongated shaft having a handle end and an opposite hook end connected to one end of the hook and a rod longitudinally slidable along the shaft between a first position wherein the rod is substantially clear of the space between opposite ends of the hook so that a truss beam may be received therein and a second position wherein the rod extends substantially across the space whereby withdrawal of the beam between the opposite ends is prevented. Since the rod is substantially co-extensive with the shaft, it may be conveniently manipulated adjacent the handle end of the shaft for movement of its opposite end between the first and second positions for opening and closing the hook respectively. Because the hook may be closed and releasably locked in the closed position with a truss beam received in the hook, there is no danger of the beam accidently slipping out of the hook until the truss beam is rotated to its upright position and secured in position by alternate permanent means. Accordingly, the truss lifting apparatus and method of the present invention enable building trusses to be handled quickly, easily and safely.

BRIEF DESCRIPTION OF THE DRAWINGS

FIG. 1 is a partially sectional foreshortened perspective view of a truss lifting apparatus of the invention;

FIG. 2 is a foreshortened side elevational view of the truss lifting apparatus showing the movable rod in the second or closed position;

FIG. 3 is a diagrammatic illustration of a building truss in an inverted position on a pair of building walls;

FIG. 4 is a diagrammatic illustration showing the building truss rotated to an upright position by the apparatus of the invention;

FIG. 5 is an enlarged detail and partially sectional view of the handle end of the apparatus; and FIG. 6 is a further enlarged cross sectional view of the handle end of the apparatus as seen on line 6—6 in FIG. 5.

DESCRIPTION OF THE PREFERRED EMBODIMENT

The truss lifting apparatus 10 of the present invention includes a generally U-shaped hook 12 having spaced apart opposite ends 14 and 16. One end 14 of the hook is connected to an elongated shaft 18 having a hook end 20 and a handle end 22. The hook is preferably rigidly secured to the shaft 18 such as by welding and a gusset 24 may be secured at the juncture to maintain the perpendicular relation between the shaft and the hook end 14.

Shaft 18 is of tubular construction and an elongated rod 26 is telescopically slidably received therein. Rod 26 is substantially co-extensive with the shaft 18 so as to be accessible adjacent the handle end 22 of the shaft while the opposite end thereof is disposed adjacent the hook 12. Rod 26 is longitudinally movable between a first position shown in FIG. 1 wherein the rod is substantially clear of the space 28 between the opposite ends 14 and 16 of the hook and the second position of FIG. 2 wherein the rod extends substantially across the space 28 so as to close the open side of the hook 12. For this purpose, hook end 16 is provided with an annular ring 30 disposed in axial alignment with the shaft 18 for receiving the rod 26 in its second or closed position.

To axially move the rod 26 within the shaft 18, there is provided a tubular handle 32 telescopically slidable on the external surface of the shaft 18. A projection such as bolt 34 secures the tubular handle 32 to the rod 26 for sliding movement in unison. Bolt 34 extends through an elongated slot 36 in the shaft 18 adjacent the handle end 22 thereof. The opposite ends of slot 36 include lateral extensions as at 38 and 40 for receiving bolt 34 when the rod is in the first and second positions therefor respectively. Note that extension 38 is curved laterally and vertically to prevent movement of the rod 26 to its second or closed position when the bolt 34 is engaged therein and extension 40 is curved laterally and vertically downwardly to retain the rod 26 in its second position against the force of gravity when bolt 34 is received therein.

The operation of the truss lifting apparatus 10 is described with relation to FIGS. 3 and 4 wherein there is shown a building truss 42 which consists of a plurality of interconnected beams 44, 46 and 48 and interconnecting braces 50. The truss is conventionally positioned in the inverted position shown in FIG. 3 on a pair of spaced apart walls 52 and 54. In order to right the truss 42 to the upright position of FIG. 4, a carpenter 56 first moves the tubular handle 32 to its lowermost position on the shaft 18, thereby moving the rod 26 to its first position substantially clear of the open end of the hook 12. The shaft 18 is then manipulated for engaging the hook 12 onto a lower portion of beam 44. The tubular handle 32 is then moved upwardly on shaft 18 to lift rod 26 to its second or closed position indicated in FIG. 2. With the hook closed, handle 32 is then rotated to move bolt 34 into lateral extension 40 whereupon the bolt becomes seated at the closed end of the extension for releasably securing the rod against movement to its lowered first position. The carpenter may then conveniently manipulate the elongated shaft 18 for rotating the truss 42 to its upright position of FIG. 4 without fear of loosing his grip on the truss. After the truss is righted and secured in position by nails or other permanent fastening means, the operator need only rotate hangle 32 to move bolt 34 out of extension 40 and then allow the handle and rod 26 to drop to their lower first positions to open hook 12. The hook 12 may then be freely moved so that the beam is withdrewn between the opposite ends 14 and 16.

It will be apparent that the truss lifting apparatus 10 of the present invention may also be used for lifting the truss 42 onto the building walls 52 and for positioning the truss on the walls. These latter operations may require several operators, each using a separate truss lifting apparatus.

The method of lifting a truss according to the present invention is believed to be fully disclosed in and apparent from the above description.

Accordingly, the present invention enables truss structures to be conveniently and easily lifted and moved without expensive equipment and without any danger of the operator loosing his grip on the truss. Thus there has been shown and described a truss lifting apparatus and method which accomplish at least all of the stated objects.

I claim:

1. An apparatus for lifting a truss including a plurality of interconnected beams, said apparatus comprising,
   a generally U-shaped hook adapted to receive one of said truss beams therein, said hook including spaced apart opposite ends,
   an elongated shaft having a hook end and a handle end, said hook end being connected to one end of said hook,
   a rod connected to said shaft for longitudinal sliding movement therealong between a first position wherein said rod is substantially clear of the space between opposite ends of said hook so that a truss beam may be received therein and a second position wherein said rod extends substantially across said space whereby withdrawal of said beam between said opposite ends is prevented,
   said rod being substantially co-extensive with said shaft such that the rod may be manipulated adjacent the handle end of said shaft for movement between said first and second positions.

2. The apparatus of claim 1 wherein said shaft is of tubular construction and said rod is slidably disposed within said shaft.

3. The apparatus of claim 2 further comprising handle means for longitudinally moving said rod within said shaft, said handle means being disposed externally of said shaft and adjacent the handle end thereof.

4. The apparatus of claim 3 wherein said shaft has an elongated slot adjacent the handle end thereof, and said handle means comprising a projection secured to said rod and extended outwardly through said slot for longitudinal sliding movement therein.

5. The apparatus of claim 4 wherein said elongated slot includes a lateral extension positioned for receiving said projection when said rod is in the second position therefor, thereby to releasably secure said rod in said second position.

6. The apparatus of claim 5 wherein said elongated slot includes a lateral extension positioned for receiving said projection when said rod is in the first position therefor, thereby to releasably secure said rod in said first position.

7. The apparatus of claim 4 wherein said handle means further comprises a tubular handle telescopically received onto said shaft, said tubular handle being secured to said projection for longitudinal sliding movement therewith.

8. The apparatus of claim 1 wherein the opposite end of said hook includes an opening which is adapted to receive said rod in the second position therefor.

9. The apparatus of claim 1 wherein said shaft is directed generally perpendicular to said one end of the hook.

10. A method of lifting a truss including a plurality of interconnected beams, said method comprising,
    providing a generally U-shaped hook having spaced apart opposite ends, an elongated shaft having a handle end and a hook end connected to one end of said hook and a rod substantially co-extensive with said shaft and longitudinally slidable therealong,
    moving said rod to a first position wherein said rod is substantially clear of the space between opposite ends of said hook,
    positioning said hook to receive one of said truss beams therein, manipulating said rod adjacent the handle end of said shaft to longitudinally move said rod to a second position wherein said rod extends substantially across the space between opposite ends of said hook whereby withdrawal of said beam between said opposite ends is prevented,
    manipulating said shaft to raise said hook and the beam received therein to a desired position,
    returning said rod to the first position therefor, and
    moving said hook so that said beam is withdrawn between the opposite ends thereof.

11. The method of claim 10 wherein said rod is longitudinally slidable within said shaft, said shaft including an elongated slot adjacent the handle end thereof and said rod including a projection extended outwardly through said slot for longitudinal sliding movement therein,
    said steps of moving and manipulating said rod comprising longitudinally moving said projection within said slot.

12. The method of claim 11 further comprising providing a tubular handle telescopically received onto said shaft and secured to said projection, said steps of moving and manipulating said rod comprising telescopically sliding said handle on said shaft adjacent the handle end thereof.

13. The method of claim 12 wherein said elongated slot includes a lateral extension positioned for receiving said projection when said rod is in the second position therefor, and further comprising releasably securing said rod in said second position by moving said projection into said lateral extension.

* * * * *